(12) United States Patent
Naoki

(10) Patent No.: US 10,907,982 B2
(45) Date of Patent: Feb. 2, 2021

(54) ROUTINE GUIDANCE SYSTEM USING LIFE LOG

(71) Applicants: Hyundai Motor Company, Seoul (KR); Kia Motors Corporation, Seoul (KR)

(72) Inventor: Okamoto Naoki, Yokohama (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 15/983,252

(22) Filed: May 18, 2018

(65) Prior Publication Data

US 2018/0335310 A1    Nov. 22, 2018

(30) Foreign Application Priority Data

May 18, 2017  (JP) .................................. 2017-99253

(51) Int. Cl.
*G01C 21/34*      (2006.01)
(52) U.S. Cl.
CPC ..... *G01C 21/3484* (2013.01); *G01C 21/3423* (2013.01); *G01C 21/3469* (2013.01)
(58) Field of Classification Search
CPC ............ G01C 21/3484; G01C 21/3469; G01C 21/3423
See application file for complete search history.

(56) References Cited

U.S. PATENT DOCUMENTS

| 2015/0127191 A1* | 5/2015 | Misra ................... G08G 1/0112 701/1 |
| 2017/0219364 A1* | 8/2017 | Lathrop .............. G01C 21/3453 |
| 2018/0231386 A1* | 8/2018 | Bellotti .................. G01C 21/20 |

FOREIGN PATENT DOCUMENTS

| JP | 2007-303991 A | 11/2007 |
| JP | 2008-234009 A | 10/2008 |
| JP | 2014-025799 A | 2/2014 |
| KR | 10-2012-135396 | 12/2012 |
| KR | 10-2016-0070029 | 6/2016 |
| WO | 2009-147711 A1 | 12/2009 |
| WO | 2014-080380 A2 | 5/2014 |

* cited by examiner

*Primary Examiner* — Michael V Kerrigan
(74) *Attorney, Agent, or Firm* — Mintz Levin Cohn Ferris Glovsky P.C.; Peter F. Corless

(57) ABSTRACT

A route guidance system for a car navigation device can include: a control unit configured to operate as: a life log information receipt means configured to receive the life log information from a life log acquisition device; a condition setting means configured to set a condition based on a selection by the user of at least one condition among a plurality of conditions including a moving condition for route guidance and a user activity condition relating to user activity; and a route guidance means configured to provide route guidance based on the life log information and the condition set by the condition setting means and to provide to the user a suggestion of moving using a moving means other than a vehicle, or a suggested place to spend time for exercise, based on a destination set by the user and an expected arrival time at the destination.

11 Claims, 3 Drawing Sheets

[FIG. 1]
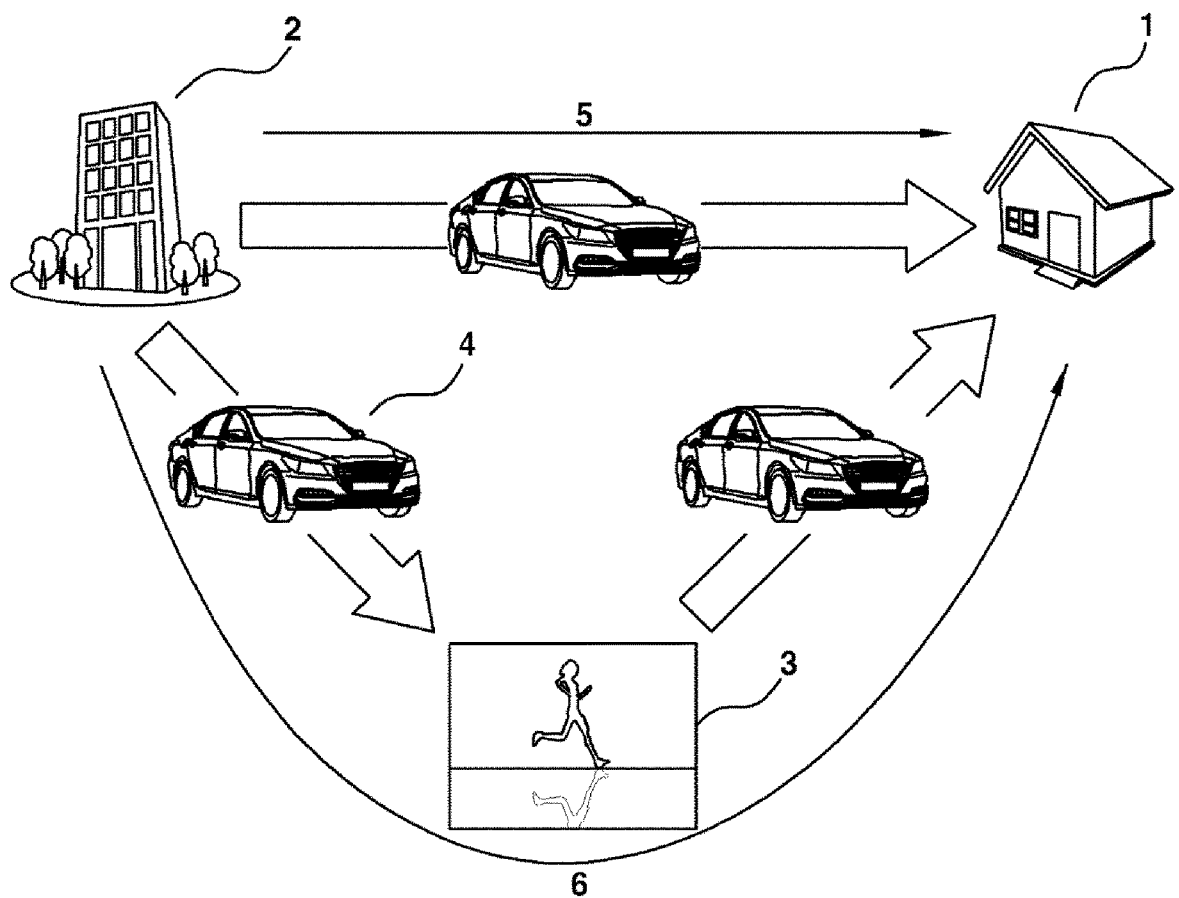

[FIG. 2]
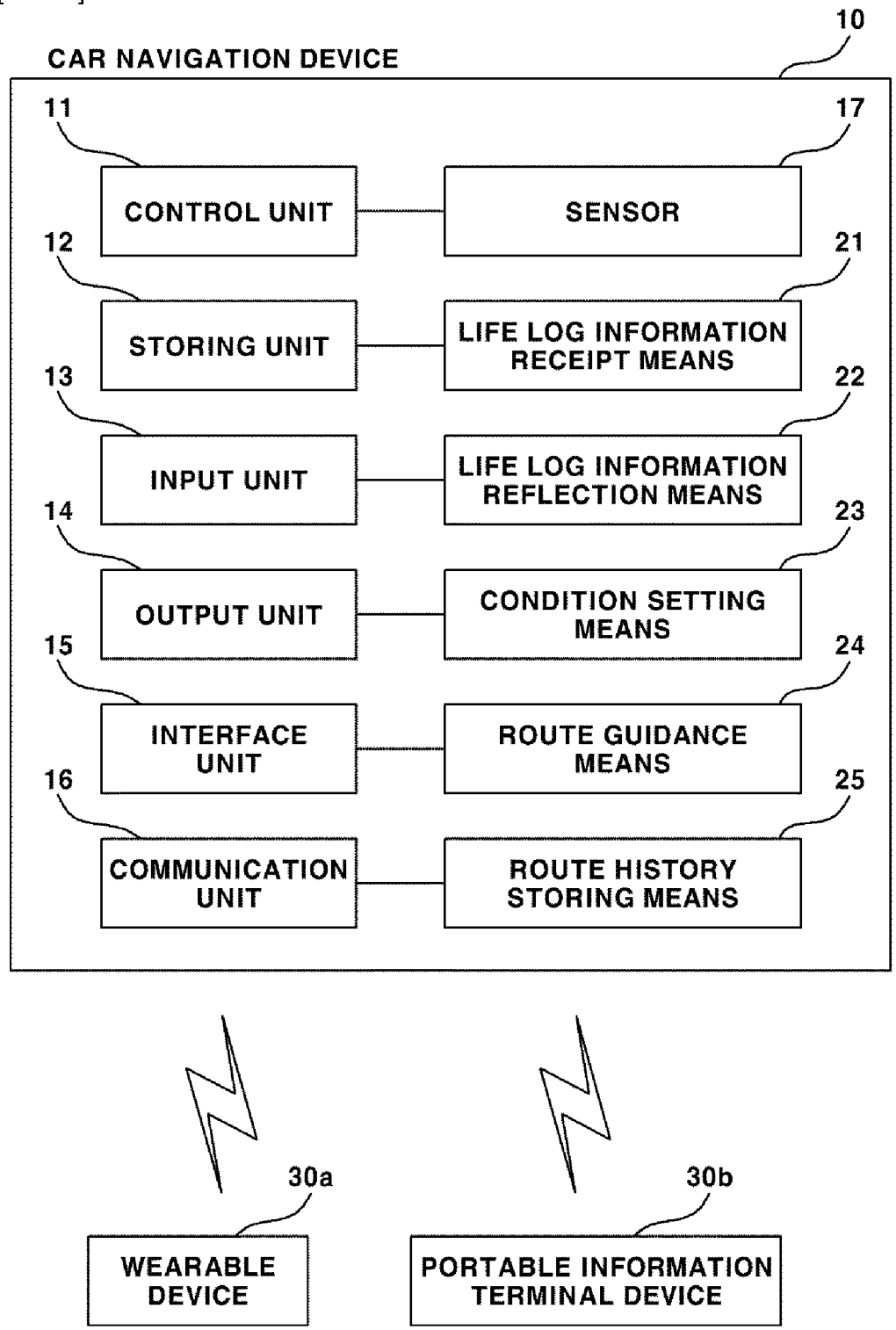

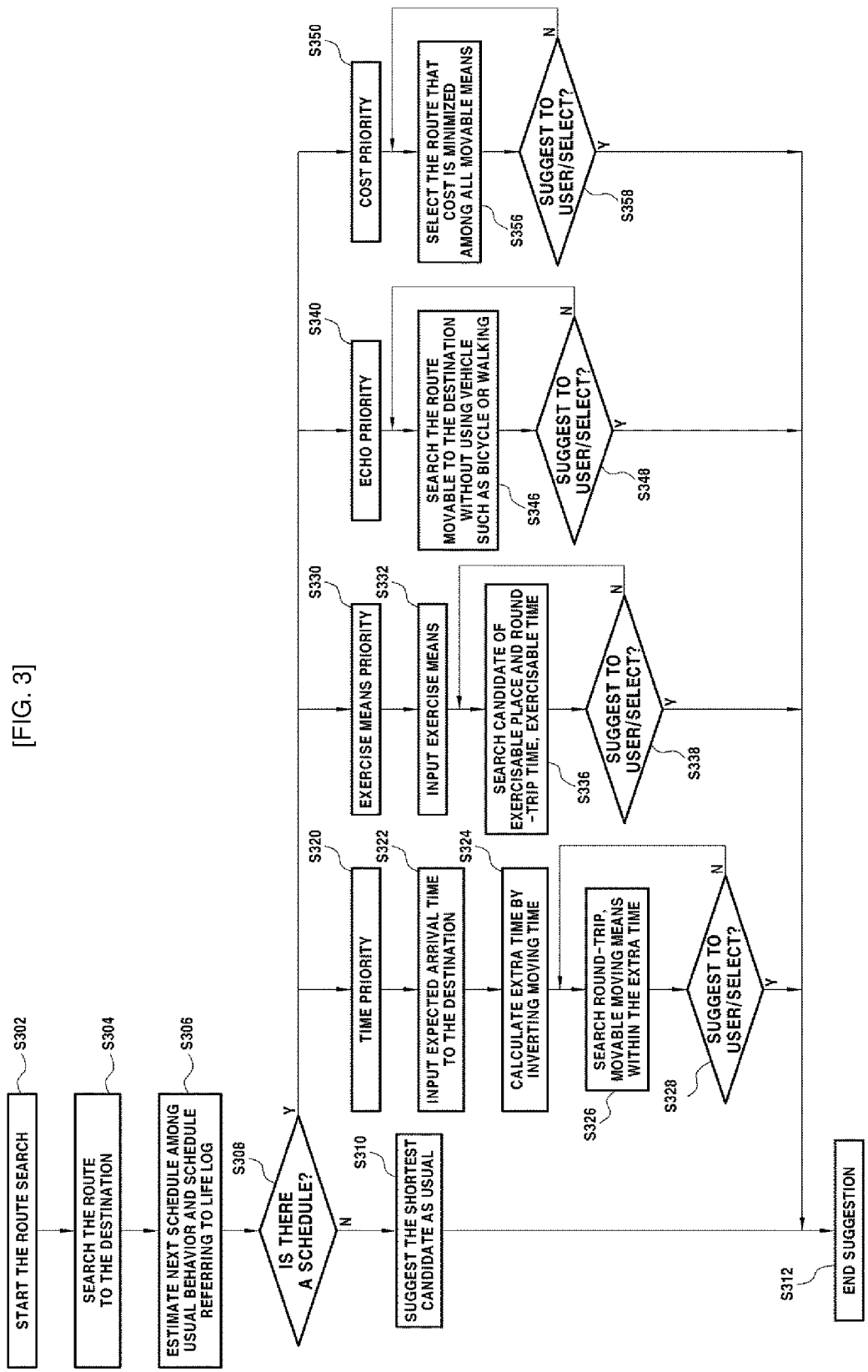
[FIG. 3]

ROUTINE GUIDANCE SYSTEM USING LIFE LOG

CROSS-REFERENCE TO RELATED APPLICATION

This application claims under 35 U.S.C. § 119(a) the benefit of priority to Japanese Patent Application No. 2017-99253, filed on May 18, 2017, the entire contents of which are incorporated herein by reference.

BACKGROUND

(a) Technical Field

The present disclosure relates to a route guidance system using a life log, and more particularly, to a system for guiding a route by incorporating life log information of a user acquired from a life log acquisition device into a car navigation device.

(b) Background Art

Currently, many vehicles are equipped with a car navigation device for providing route guidance. Conventional car navigation devices can suggest a plurality of routes based on factors, such as highway priority, road priority, time priority, fare priority, and congestion avoidance, and can allow a user to select one of the routes. Similarly, smart phone applications can provide a pedestrian-only navigation.

Meanwhile, many wearable devices, such as a wrist watch, have an activity meter function (e.g., calorie consumption) by measuring a walking speed, a walking pitch, a walking distance, a walking time, a height, a weight, etc. Some wearable devices include a Global Navigation Satellite System (GNSS) receiver, such as a global positioning satellite (GPS) device, mounted therein to acquire an accurate position, an altitude, and time information, allowing the device to trace a moving position of the user. Some wearable devices are also equipped with a heart rate measurement function (e.g., using an optical pulse gauge) to determine conditions such as an exercise state or a sleeping state by combining measurements from an optical pulse gauge with measurements from an acceleration sensor or a gyro sensor.

The measured information is recorded and transmitted directly to a smart phone, a personal computer (PC), or the like through a wired communication such as an USB or near-field wireless communication. The information is stored in a server (e.g., on the cloud) through the Internet or a communication network of a wireless communication provider and converted into a user-friendly display format to be displayed on the smart phone or the PC. Some of the activity meter function can also be implemented on a user's smart phone (e.g., by installing an application). Many smart phones further include a scheduler function for recording the user's schedule or behavior.

All of the measured data described above, including the activity history of the user, the behavior history of the user, and even a history of any e-mails transmitted or received by the user's smart phone, can be recorded in a "life log."

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure is made considering the related art, and the object of the present disclosure is to provide a route guidance system using a life log of a user (e.g., for fitness).

In accordance with embodiments of the present disclosure, a route guidance system for a car navigation device linked to life log information of a user can include: a control unit including a memory storing program instructions and a processor executing the program instructions, wherein, upon executing the program instructions, the control unit is configured to operate as: a life log information receipt means configured to receive the life log information from a life log acquisition device; a condition setting means configured to set a condition based on a selection by the user of at least one condition among a plurality of conditions including a moving condition for route guidance and a user activity condition relating to user activity; and a route guidance means configured to provide route guidance based on the life log information and the condition set by the condition setting means and to provide to the user a suggestion of moving using a moving means other than a vehicle, or a suggested place to spend time for exercise, based on a destination set by the user and an expected arrival time at the destination.

The life log information can include a record of historical information relating to at least one of biometric information of the user, exercise information of the user, movement information of the user, and schedule information of the user.

The plurality of conditions can include: a condition of only using the vehicle as the moving means, a condition setting the expected arrival time, a condition of selecting an exercise means of the user, a condition of fuel efficiency of the vehicle, a condition of an exercise amount of the user, and a condition of minimizing cost.

The control unit can be further configured to operate as a route history storing means configured to store route history information indicating that the user has moved and information indicating a satisfaction level evaluated by the user, and the route guidance means can be further configured to provide the route guidance based further on the route history information and the satisfaction level evaluated by the user.

The life log acquisition device can include a wearable device or a portable terminal device, and the car navigation device can acquire the life log information from the life log acquisition device through near-field wireless communication.

Furthermore, in accordance with embodiments of the present disclosure, a route guidance method for a car navigation device linked to life log information of a user can include: receiving, by a control unit including a memory and a processor, the life log information from a life log acquisition device; setting, by the control unit, a condition based on a selection by the user of at least one condition among a plurality of conditions including a moving condition for route guidance and a user activity condition relating to user activity; searching, by the control unit, for a route to a destination set by the user; providing, by the control unit, the user a suggestion of moving using a moving means other than a vehicle, or a suggested place to spend time for exercise, based on a destination set by the user and an expected arrival time at the destination; and providing, by the control unit, the route guidance to the destination after completing the search for the route based on the life log information and the condition set by the condition setting means.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, wherein:

FIG. 1 is a diagram for explaining a route guidance system using a life log in accordance with embodiments of the present disclosure;

FIG. 2 is a schematic configuration diagram of the route guidance system illustrated in FIG. 1; and FIG. 3 is a flowchart illustrating a method for suggesting the route guidance for the user in the route guidance system illustrated in FIG. 2.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, examples of embodiments of the present disclosure will be described in detail with reference to the drawings.

FIG. 1 is a diagram illustrating the concept of a route guidance system using a life log in accordance with embodiments of the present disclosure.

As shown in FIG. 1, a route guidance system of a car navigation device is mounted in a vehicle 4 operated by a user. For example, if the user travels directly to home 1, the car navigation guides a returning route 5 as usual, and the user returns to home 1 without getting out of the driving vehicle.

Meanwhile, life log information acquired from a life log acquisition device commonly used by the user, for example, information relating to exercise acquired by a wrist watch-type activity meter or history information of a smart phone is incorporated into the car navigation device through a near-field wireless communication such as IEEE 802.15 or a wired communication means such as an USB. If it is determined to be faster than a usual time for returning to home, based on the user's schedule or behavior history, the car navigation device, referring to the acquired life log information, suggests to the user candidates to visit of one or more routes 6 including an exercise park 3 to perform activities such as walking or jogging, an athletic field, a fitness club, a sport gym, and the like, together with its time, its distance, its calorie consumption, etc. The user selects a desired route 6 considering extra time, exercise amount, cost, etc. from the candidates of the route 6 that passes a plurality of stops suggested by the car navigation, and instructs that route 6 to the car navigation device. The congestion of the life log is automatically performed when the car navigation device recognizes the life log acquisition device such as the wrist watch-type activity meter or the smart phone upon its operation, or performed by both applications of the car navigation and the life log acquisition device by a voluntary operation of the user.

The present disclosure is not limited to the case that the user returns to the home 1 from the office 2 or a workplace, and is also applied to the cases that an outing place, a business-trip place, a travel place, etc. are set as the destination. In this case, the car navigation device suggests a parking lot considering fare, congestion level, jam, etc., and a moving means such as walking or bicycle from that place based on the life log. Of course, in this case, fitness, a walking spot, or a tracking route, etc. is also suggested as candidates.

In addition, by carrying the life log acquisition device such as the wrist watch-type activity meter or the smart phone to always record a moving state of the user, the car navigation device specifies a moving means routinely used and learns the moving means from the information such as a moving speed or acceleration that is recorded and stored. As the learned information, after the user drives the vehicle 4, by specifying when and which moving means is selected a lot, for example, the moving means used such as walking, jogging, and bicycle, the used date, etc. is recorded and stored therein.

As described above, the conventional car navigation performs route guidance assuming that the user goes directly to the destination in the driving vehicle 4, but the present disclosure can allow the user to optionally select the route 6 including locations exercise or other moving means along the route to the destination, and if there is extra time before reaching the destination, the user can spend the extra time for exercise, such that it is possible to adjust the time until the arrival time.

In addition, by using a nearby parking lot considering fare, congestion level, jam, etc. without using a driving vehicle 4 until just before the destination, it is possible to improve fuel efficiency of the vehicle 4 and to increase calorie consumption of the user, etc., thus emphasizing environmental-friendly behavior based on the spirit of park-and-ride. In addition, if the moving time clearly belongs to the time zone assuming congestion on the route, the moving time of the driving vehicle can be converted into the exercise time to effectively use the time.

FIG. 2 is a schematic configuration diagram of the route guidance system illustrated in FIG. 1.

As shown in FIG. 2, the route guidance system is composed of, at least, a car navigation device 10, a wearable device 30a, and a portable information terminal device 30b.

The car navigation device 10 is composed of a control unit 11, a storing unit 12, an input unit 13, an output unit 14, an interface unit 15, a communication unit 16, a sensor 17, etc., and is composed of a life log information receipt means 21, a life log information reflection means 22, a condition setting means 23, a route guidance means 24, a route history storing means 25, etc. that are implemented by the corresponding hardware and the corresponding software applications.

The wearable device 30a is a wrist watch-type activity meter having a plurality of built-in sensors, and as the activity meter function, measures and calculates a walking pitch, a walking distance, a walking time, a walking speed, etc., and calculates the calorie consumption by registering a height, a weight, etc. In addition, by embedding a GNSS receiver, such as a GPS device, an accurate location, latitude, and time are acquired. In addition, by measuring a pulse as biometric information or acceleration as information relating to exercise, it is also used for determining conditions such as an exercise state or a health state, etc. of the user with the wearable device 30a.

The information acquired from the wearable device 30a, as life log information, is transmitted to the car navigation device 10 upon operation of the car navigation device 10 or voluntarily by the user through a near-field wireless communication; in addition, although not illustrated, by mounting the wearable device 30a on a cradle, it is transmitted directly to a smart phone or a personal computer (PC) through a wired communication such as an USB or a near-field wireless communication. In addition, it is stored in a server (e.g., on the cloud) through the Internet or a communication network of a wireless communication provider and also processed in the user-desired display format in the server and transmitted to the smart phone or the PC again to be displayed thereon.

The portable information terminal device 30b is a smart phone or a tablet terminal, and the smart phone embedding various sensors installs the corresponding application to implement some functions of the activity meter incorporated into the wearable device 30a and also, as a general function, a scheduler recording the user's schedule or behavior, sending/receiving records of a mail or a telephone, etc. are included therein.

The information acquired from the portable information terminal device 30b, as the life log information, is transmitted to the car navigation device 10 upon operation of the car navigation device 10 or voluntarily by the user through a near field wireless communication. In addition, although not illustrated, it is stored in a server (e.g., on the cloud) through the Internet or a communication network of a wireless communication provider by interposing the PC by a wired communication such as an USB, and processed in the user-desired display format in the server and again transmitted to the portable information terminal device 30b or the PC to be displayed thereon.

The control unit 11 controls the entire operation of the car navigation device 10 so as to implement control of each hardware component of the car navigation device 11, each receipt of information, operation of software applications, and each means described herein.

The storing unit 12 includes a ROM storing an Operating System (OS) or a software code of the software application, a RAM temporally storing data necessary for execution of the application, a flash memory or a Solid State Drive (SSD), etc. permanently storing data generated by the result of the application execution or data used by the application. In addition, a memory card or an external storage device by an USB interface can be also used.

The input unit 13 includes an operation panel including a touch panel integrated with a display, a microphone for voice recognition, etc.

The output unit 14 includes a display for displaying various navigation information, a warning lamp, a speaker as a voice output, a warning buzzer, etc.

The interface unit 15 communicates with a built-in computer in the vehicle, and for example, receives the vehicle information from an Electronic Control Unit (ECU) through an On-Board Diagnostics (OBD) 2.

The communication unit 16 receives information through a wired or a wireless communication means with an external device. The wired communication means includes an USB interface, and receives music data or image data through the USB. The wireless communication means includes a near-field wireless communication such as IEEE 802.15, and receives information in communication with the wearable device 30a such as a wrist watch-type activity meter and the portable information terminal device 30b such as a smart phone.

The sensor 17 is composed of a plurality of sensors, and includes a camera shooting an inside/an outside of the vehicle including the front/rear or the surroundings of the vehicle, a GNSS sensor acquiring location, latitude, and time information, a gyro sensor, an acceleration sensor, a geomagnetic sensor, and a shock sensor that sense a vehicle state, a temperature sensor and a humidity sensor that sense a nearby state, etc.

The life log information receipt means 21 acquires, through the communication unit 16, the life log information such as the user's walking pitch, moving distance, moving time, moving speed, moving route, moving time, calorie consumption, and heart rate from the wrist watch type wearable device 30a having the activity meter function by the near field wireless communication such as IEEE 802.15 to store them in the storing unit 12. In addition, the life log information receipt means 21 acquires, through the communication unit 16, the life log information such as the user's schedule or behavior record from the scheduler or the mail record of the portable information terminal device 30b such as a smart phone by the near field wireless communication such as IEEE 802.15 to store them in the storing unit 12.

The life log information reflection means 22 reflects the life log information, which is transmitted to and incorporated into the car navigation device 10 from the life log acquisition device including the wearable device 30a and the portable information terminal device 30b through the near-field wireless communication, to the condition setting means 23. The life log information incorporated by the life log information receipt means 21 is reflected to the route suggested to the user, and to the priority level of the condition for selecting the route suggested by the user.

The condition setting means 23 suggests to the user a plurality of conditions including the moving condition for route guidance and the condition relating to the user's activity with respect to the route that becomes the candidate based on the priority level that is set based on the life log of the user by the life log information reflection means 22, and sets at least one condition among the plurality of the suggested conditions by the user's selection.

The route guidance means 24 searches, through the condition setting means 23, the information of the stops registered in the storing unit 12 together with the pre-corresponding life log information based on one or more conditions among the plurality of routes selected by the user to suggest one or more routes to which the life log information of the user is reflected.

The route history storing means 25 stores the route where the user actually has moved as history information and also stores a satisfaction level evaluated by the user. The satisfaction level on the route where the user has moved is fed back to the life log information reflection means 22 and the condition setting means 23, and reflected to the priority level of the route guidance based on the satisfaction level evaluated by the user. As the satisfaction level evaluated by the user, the function that bookmarks at the corresponding location on the map of the car navigation device 10 is used. Attribute information such as color classification is given to the rank of the satisfaction level.

In addition, other various functions or detailed operating methods thereof such as a user interface and a display method generally used in the car navigation are omitted in order to avoid obscuring the subject matter of the present disclosure. In addition, in the embodiment of FIG. 2, although the life log acquisition device is illustrated by dividing into the wearable device 30a and the portable information terminal device 30b, the wearable device 30a and the portable information terminal device 30b can be also implemented as one life log acquisition device by incorporating the scheduler into the wearable device 30a, or the activity meter into the portable information terminal device 30b, etc.

Conditions generating the route guidance of the car navigation device 10 in accordance with the present disclosure will be described. Firstly, it is necessary that there is at least a certain amount time for traveling to the destination. Accordingly, when the user is in a hurry, the route guidance means 24 of the car navigation device 10 performs, as usual, user-selectable route guidance among a plurality of routes such as highway priority, road priority, time priority, fare priority, and congestion avoidance.

The route guidance means 24 of the car navigation device 10 uses, as the determination of an extra time, an average return time calculated from the history of the return time recorded daily in the life log acquired from the portable information terminal device 30b through the life log information receipt means 21, and if there is a sufficient time until the average return time compared to an average reach time to the destination, suggests the route guidance through the life log information reflection means 22 and the condition setting means 23. In addition, if there is no schedule referring to schedule management data acquired from the portable terminal device 30b, the route guidance means 24 determines it as an extra time to suggest the route. For example, the route guidance means 24 records the usual return time when returning from a company to home, and suggests the candidate in the range of not hurting the user's route referring to the reach time to the destination, the meal time, and usual behavior history if it is possible to return to home earlier than the recorded time.

In the case that there is a parking lot or an exercise park near the guided route, the route guidance means 24 displays the options through the condition setting means 23 only if it is possible to secure the time that adds the exercise time selected by the user to the moving time to the destination and the round-trip time to the passing place. That is, in order to promote exercise using extra time, the exercise place is set as the stop.

The route guidance means 24 firstly selects the place where vehicle parking and exercise are possible, and if the parking fee of the vehicle is equal to that of the destination, selects the place where the parking fee on the way back is minimized.

Next, the priority level of the route suggestion of the car navigation device 10 will be described. The score concept is introduced as the priority level of the route in the route guidance. At the timing when the user designates the destination, the car navigation device 10 calculates the score (i.e., the priority level) for the following parameters to set the priority rankings. However, it is possible to ignore the score if the driver strongly desires to exercise.

(1) The Reach Time to the Destination

It is set to be the moving time of the vehicle the moving time+the round-trip time to the exercise point+the exercise time. In this time, if the exercise point is a park, the time consumption is a low-score because it is not calculated to the movement, and the case that both the movement and the exercise are possible increases the score.

(2) Suggest the Exercise Method Depending upon the User's Preference

Referring to average calorie consumption or a heart rate, etc. from the result of the life log, the priority rankings are set for the moving routes such as walking, jogging, bicycle, etc. or the stops such as an athletic field, a fitness club, a sports gym, etc., and the activity means regarded as the user's preference is suggested. In addition, if the moving place is an outdoor, etc., the season information that depends upon a sunset time or temperature, and the climate that can affect rain or outside-air temperature, etc. are added to the score.

(3) Energetic Value Obtained by the Exercise

Considering savings of fuel efficiency of the vehicle and the energy that the user can consume, for example, if the fuel efficiency is enhanced, the score that the exercise load increases, etc. is given.

(4) Burden on Cost

The route is suggested considering occurrence of the cost such as a parking fee and a facility usage fee, etc. required for exercise.

(5) Past Satisfaction Level

The history of the exercise and route performed once is stored in the storing unit 12 through the route history storing means 25; after actually using it, the user's satisfaction level is fed back to the route guidance from next time. By increasing the percentage of the score for the route, the place, and the exercise means that were used in a high level of satisfaction, the score increases from next time.

Below, a method of suggesting the route guidance based on the life log information will be described. The information included in the life log, as described above, includes the user's biometric information, schedule, sending/receiving record of the mail, exercise in daily life, or position information such as the origin and the destination, and moving information such as a moving time and a moving means.

A detailed example that links the history of the life log information of the user to the route guidance of the car navigation device 10 is listed below.

(a) (Schedule history linking) every year, when it is the same season, the number of times to go to an A sports gym at X increases. →when the vehicle operated by the user passes near the A sports gym around at X, the car navigation device 10 includes the A sports gym in the route candidate and suggests it.

(b) (Position information history linking) until last month, the user drove the vehicle to a nearby C paid parking lot and then walked slowly from there to the destination, but recently, the user parked the vehicle in a D paid parking lot that is a bit far away but is a cheap parking fee and then walked fast. →It is determined that it is the savings of the parking fee or during exercise, the car navigation device 10 suggests the parking lot that is the same distance but is a cheaper parking fee.

(c) (Time priority by the moving history linking) referring to the life log information of the user, even in case of moving by getting on someone's driving vehicle, if the vehicle passes the route that does not exist in the pre-stored route candidates in the car navigation device 10 and also shortens the time upon moving to a specific destination, it is determined as the shortcut where a local resident uses, such that it is included in the route candidate and suggested from next time.

(d) (Use of biometric information) only if the user accepts the route including the exercise process and a prior approval was obtained, even in case of moving by getting on someone's driving vehicle, the car navigation device 10 adjusts the indoor temperature of the vehicle to a comfortable temperature after the user's exercise at the timing when the user returns to the vehicle by linking with an air conditioner upon moving to a specific destination.

(e) (Use of biometric information) the case that there is no need for an extra meal such as snacks by calculating calorie consumption for the user's exercise amount, fuel efficiency of the vehicle, and the moving distance is determined as an ECO, and otherwise, the fuel efficiency of the vehicle is determined as an ECO.

(f) (Cost minimization) referring to the biometric information and the moving history, for example, after so-called A exercise, the expected calorie consumption of the user from the tendency to have high-calorie meals, etc. is calculated, and it is suggested as to whether to select more costly one by selecting the exercise rather than the vehicle movement or otherwise, whether to select the vehicle movement, respectively.

FIG. 3 is a flowchart for explaining a method of suggesting the route guidance to the user in the route guidance system illustrated in FIG. 1.

As shown in FIG. 3, the route guidance means 24 of the car navigation device 10, through the condition setting means 23, allows the user to select a desired condition among A. [As Usual]/B. [Time priority (Time minimization)]/C. [Exercise means priority (Preferable exercise method)]/D. [Eco priority (fuel efficiency, consumed energy)]/[E. Cost priority]. Each option has parameters that can be set by the user, and reflected to the score calculation.

A. [As usual] indicates that the user moves to the destination by the driving vehicle without stopping anywhere such as when the user is in a hurry. B. [Time priority] inputs an expected arrival time to the user, and the car navigation device 10 optimizes it to be the most efficient route to reach by that time. C. [Exercise means priority] inputs an activity means including an exercise means such as walking, jogging, fitness, etc. to the user. D. [Eco priority] allows the user to select whether to prioritize the fuel efficiency or to prioritize the exercise amount. E. [Cost priority] suggests cost-free means.

Firstly, if the user operates the car navigation device 10 mounted in the vehicle to start performing the route search to the destination (S302), the car navigation device 10 searches the route to the destination that is set (S304). The car navigation device 10 refers the life log of the storing unit 12 stored by being received by the life log information receipt means 21 from the life log acquisition device such as the wearable device 30a or the portable information terminal device 30b, and estimates next schedule among usual behavior and schedule by the life log information reflection means 22 (S306).

If there is room for the time to the destination and the next schedule is estimated (S308), the car navigation device 10 allows the user to select that condition among [Time priority (S320)], [Exercise means priority (S330)], [Eco priority (S340)], [Cost priority (S350)] through the condition setting means 23 and the route guidance means 24. In the S308, if there is no room for the time to the destination and the next schedule is not estimated, as usual, the shortest candidate that the user moves directly to the destination by the driving vehicle is suggested (S310). The car navigation device 10 ends the route suggestion if the moving route is selected and starts the route guidance to the destination (S312).

If [Time priority (S320)] is selected, the car navigation device 10 inputs the expected arrival time to the destination to the user (S322), calculates an extra time by inverting the moving time from the expected arrival time (S324), searches the round-trip movable moving means from the information pre-registered in the storing unit 12 within the extra time based on the life log information (S326), and suggests one or more routes to allow the user to select them (S328). The car navigation device 10 ends the route suggestion if the moving route is selected and starts the route guidance to the destination via the stops (S312).

If [Exercise means priority (S330)] is selected, the car navigation device 10 inputs the activity means including the exercise means such as walking, jogging, and fitness at the stops to the user (S332), searches the candidate of the exercisable place, and the round-trip time and the exercisable time from the information pre-registered in the storing unit 12 based on the exercise means inputted by the user and the life log information (S336), and suggests one or more routes to allow the user to select them (S338). The car navigation device 10 ends the route suggestion if the moving route is selected and starts the route guidance to the destination via the stops (S312).

If [Eco priority (S340)] is selected, the car navigation device 10 searches the route movable to the destination from the information pre-registered in the storing unit 12 without using the vehicle operated by the user such as bicycle or walking based on the life log information (S346), and suggests one or more routes to allow the user to select them (S348). The car navigation device 10 ends the route suggestion if the moving route is selected and starts the route guidance to the destination (S312).

If [Cost priority (S350)] is selected, the car navigation device 10 searches the route that cost is minimized among all moving means from the information pre-registered in the storing unit 12 based on the life log information (S356), and suggests one or more routes to allow the user to select them (S358). The car navigation device 10 ends the route suggestion if the moving route is selected and starts the route guidance to the destination via the stops (S312).

The condition selected by the user can be combined in plural by setting the priority rankings.

Several of detailed operating examples of embodiments of the route guidance system using the life log in accordance with the present disclosure will be listed.

(a) The user has time on the way back so has decided to exercise. The user inputs the expected arrival time to home in the car navigation device 10, and the car navigation device 10 suggests jogging in the park within the range that can get home by the expected arrival time.

(b) If jogging routinely, bicycle exercise is suggested at certain timing. The mobility of the bicycle is higher than that of walking or jogging, such that if the vehicle movement is changed to the bicycle movement, it is possible to achieve the balance between the cost reduction and the exercise.

(c) Set the heart of the city as the destination for going sightseeing. The car navigation device 10 suggests walking movement from a parking lot to a riverside trail using the parking lot that takes a 15-minute walk from the heart of the city. Accordingly, the parking fee is cheap and jam is avoided, such that it is possible to advance the arrival time, thus enhancing the user's satisfaction level even on the tourism side.

The route guidance system using the life log in accordance with embodiments of the present disclosure described above can, upon moving to the suggested stops until the destination, continuously guide for the user to the pedestrian navigation of the portable terminal device 30b from the car navigation device 10 by installing the application linked to the route guidance system in the portable terminal device 30b. In this case, it is possible to display the time until returning to the place where the vehicle was parked on the pedestrian navigation, or to also ring a warning message or an alarm that notifies the time.

In addition, by adding factors such as season, climate, day of the week, time zone to the candidate of the stops in the route guidance, the suggestion considering the closed day or the opening/closing time of a museum, the closed day or the opening/closing time of a garden, a recommended night view, the place not affecting pollen allergy, etc. is also possible. In addition, the information learned based on the life log information and the life log incorporated into the car navigation can be stored in a removable memory card instead of the body of the car navigation, and performed when replacing the vehicle or the car navigation.

Having described the embodiments of the present disclosure in detail with reference to the drawings, the present disclosure is not limited to the above-described embodiments, and various modifications can be made without departing from the technical scope of the present disclosure.

What is claimed is:

1. A route guidance system for a vehicle navigation device linked to life log information of a user, the route guidance system comprising:
    a control unit including a non-transitory memory storing program instructions and a processor executing the program instructions, wherein, upon executing the program instructions, the control unit is configured to operate as:
    a life log information receipt means configured to receive the life log information from a life log acquisition device;
    a condition setting means configured to set a condition based on a selection by the user of at least one condition among a plurality of conditions including a moving condition for route guidance and a user activity condition relating to user activity; and
    a route guidance means configured to provide route guidance based on the life log information and the at least one condition set by the condition setting means, and to provide to the user a first suggestion of moving using a moving means other than a motor vehicle or a second suggestion of a place to spend time for exercise, based on both a destination set by the user and an expected arrival time at the destination,
    wherein the route guidance means provides the first suggestion or the second suggestion to the user only when the route guidance means determines that there is an extra time for traveling to and destination, and wherein
    the route guidance means is configured to determine whether there is the extra time based on the life log information including a user's schedule or behavior history, received by the life log information receipt means.

2. The route guidance system of claim 1,
    wherein the life log information comprises a record of historical information relating to at least one of biometric information of the user, exercise information of the user, movement information of the user, and schedule information of the user.

3. The route guidance system of claim 2, wherein:
    the life log acquisition device includes a wearable device or a portable terminal device, and
    the vehicle navigation device acquires the life log information from the life log acquisition device through near-field wireless communication.

4. The route guidance system of claim 1,
    wherein the plurality of conditions further includes: a condition of only using the vehicle as the moving means, a condition setting the expected arrival time at the destination, a condition of selecting an exercise means of the user, a condition of fuel efficiency of the vehicle, a condition of an exercise amount of the user, and a condition of minimizing cost.

5. The route guidance system of claim 1, wherein:
the control unit is further configured to operate as a route history storing means configured to store route history information indicating the user's level of satisfaction with each route along which the user has moved, as evaluated by the user, and
the route guidance means is further configured to provide the route guidance based further on the route history information and the satisfaction level evaluated by the user.

6. A route guidance method for a vehicle navigation device linked to life log information of a user, comprising:
receiving, by a control unit including a non-transitory memory and a processor, the life log information from a life log acquisition device;
setting, by the control unit, a condition based on a selection by the user of at least one condition among a plurality of conditions including a moving condition for route guidance and a user activity condition relating to user activity;
searching, by the control unit, for a route to a destination set by the user;
providing, by the control unit, the user a first suggestion of moving using a moving means other than a motor vehicle or a second suggestion of a place to spend time for exercise, based on the destination set by the user and an expected arrival time at the destination; and
providing, by the control unit, the route guidance to the destination after completing the search for the route based on the life log information and the at least one condition selected by the user,
wherein the control unit provides the first suggestion or the second suggestion to the user only when the control unit determines that there is an extra time for traveling to the destination, and
wherein the control unit is configured to determine whether there is the extra time based on the life log information including a user's schedule or behavior history, received by the life log information acquisition means.

7. The route guidance method of claim 6,
wherein the life log information comprises a record of historical information relating to at least one of biometric information of the user, exercise information of the user, movement information of the user, and schedule information of the user.

8. The route guidance method of claim 6, further comprising
based on the destination set by the user and an expected arrival time to the destination, receiving, by the control unit, a selection by the user of whether to move using a moving means other than a motor vehicle, or of a place to spend time for exercise.

9. The route guidance method of claim 8, further comprising
receiving, by the control unit, the selection by the user of at least one condition among the plurality of conditions including the moving condition for route guidance and a user activity condition relating to user activity.

10. The route guidance method of claim 9,
wherein the plurality of conditions further includes: a condition of only using the vehicle as the moving means, a condition setting the expected arrival time at the destination, a condition of selecting an exercise means of the user, a condition of fuel efficiency of the vehicle, a condition of an exercise amount of the user, and a condition of minimizing cost.

11. The route guidance method of claim 6, further comprising
storing, by the control unit, route history information indicating that the user has moved and information indicating the user's level of satisfaction with each route along which the user has moved, as evaluated by the user,
wherein the route guidance is provided based on the route history information and the satisfaction level evaluated by the user.

* * * * *